Sept. 5, 1950  R. J. VEDOVELL  2,521,137
SEAL
Filed Jan. 26, 1946
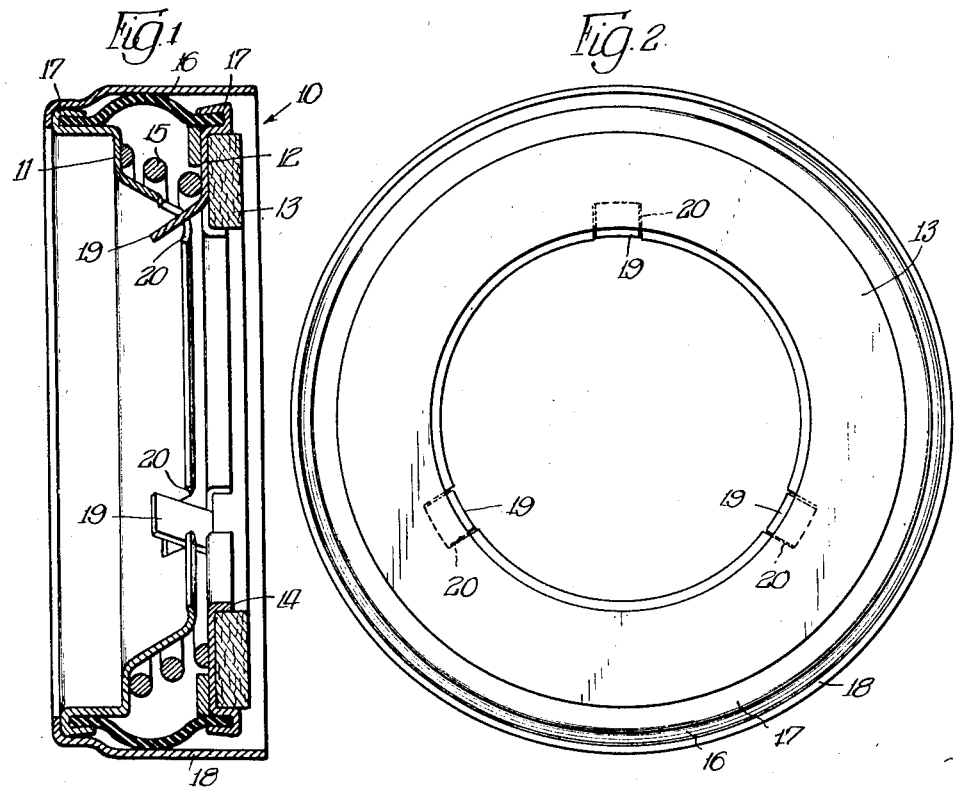
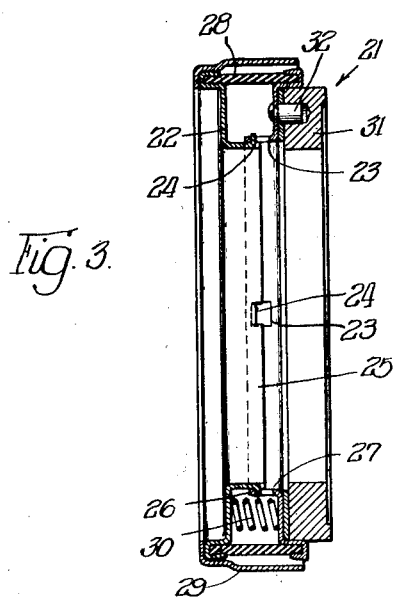
INVENTOR.
Rudolph J Vedovell,
BY
Cromwell, Greist & Warden
attys.

Patented Sept. 5, 1950

2,521,137

UNITED STATES PATENT OFFICE 2,521,137

SEAL

Rudolph J. Vedovell, Kenilworth, Ill., assignor to Chicago Rawhide Manufacturing Company, Chicago, Ill., a corporation of Illinois Application January 26, 1946, Serial No. 643,653

3 Claims. (Cl. 288—3)

This invention pertains to an oil seal of the face or end thrust, diaphragm type, and a principal object thereof is to provide such a seal of a very simple and inexpensive character, the parts of which are capable of being fabricated and assembled with a maximum of ease and speed.

Other more specific objects and advantages of the invention will be apparent to those skilled in the art upon a full understanding of the improved structure herein described.

In the drawings,

Fig. 1 is a view in longitudinal vertical section, illustrating details of construction of one embodiment of seal embodying the features of the invention;

Fig. 2 is a view in side elevation, looking from the right of Fig. 1; and

Fig. 3 is a view generally similar to Fig. 1, illustrating a modified embodiment of the invention.

Referring to Figs. 1 and 2, the reference numeral 10 generally designates a diaphragm type, end thrust or face seal in accordance with this invention, comprising a cup-like or dished annular body member 11 of stamped sheet metal adapted to receive a shaft or other member axially thereof, while the reference numeral 12 designates a floating ring serving as a support for the face sealing ring member 13. The latter is fabricated of carbon, leather or other appropriate sealing material, and it will be appreciated that the member 13 is adapted for axial or face engagement under end thrust with a further device associated with the shaft, to effect a rotatable seal at that point. The ring 12 is provided with an outwardly opening annular channel 14 in which the sealing member 13 is disposed, as illustrated in Fig. 1 and a spiral conical spring disposed between member 11 and ring 12 serves to urge the sealing member 13 axially for the aforesaid sealing engagement.

The extent of axial movement of member 11 and ring 12 is limited by an annular, confining sleeve-like diaphragm 16 disposed parallel to the axis of the seal with the opposite lateral edges thereof clamped in annular mutually facing recesses 17 of member 11 and ring 12.

An outer shield and mounting member 18 for the seal, fixedly secured to the cup-like member 11 externally and coaxially thereof serves to enclose the seal elements; the axial extent of this outer member may be varied or, in fact, the same may be entirely eliminated.

In order to prevent relative rotation of the ring 12 and cup-like member 11, I provide a plurality of circumferentially spaced, rearwardly and radially inwardly inclined fingers or lugs 19 on the former, which are produced by slitting and offsetting rearwardly the material of the ring adjacent its face groove 14. These lugs extend through correspondingly spaced recesses 20 which are punched in the adjacent surface of the member 11, as illustrated, there being relatively slight angular clearance between the lugs and the sides of the recesses, as illustrated in Fig. 2. Accordingly, though the ring 12 and sealing member 13 are freely floating axially relative to the cup-like member 11, they are effectively restrained against rotative movement relative to the remainder of the seal, so that no wracking or twisting of the components thereof results. In compressed condition of the seal, the outer member 18 serves to assist the diaphragm in centering the sealing member 13 in the radial sense.

A slightly modified embodiment of the above features is shown in Fig. 3. In this form the seal, generally designated 21, is made up of a pair of annular coacting stamped axially telescoping, flanged disk-like members 22, 23, the former being provided with radially outwardly offset fingers 24 on its axially extending flange 25. These fingers are receivable in apertures 26 located in a similar flange 27 of the member 23, in spaced relation to the rear edge of said flange, so as to couple the members 22, 23 for rotation together. A sleeve-like diaphragm 28 is clamped in the members in a manner similar to that described with reference to Fig. 1, and a similar external mounting and shield member 29 is secured to member 22. In this embodiment a plurality of individual coil springs 30 disposed between the members 22, 23 serves to urge the same apart axially. The face sealing member 31 is secured to the member 23, as by rivets 32, to prevent relative rotation of member 31, and the fingers 24, in engaging the rear margin of apertures 26, serve as positive stops limiting movement of sealing member to the right, under the force of springs 30. This positive restraint is desirable in the event the material of diaphragm tends to stretch or "grow" under the conditions of operation.

In both of the foregoing structures I provide a seal including a fully floating face sealing member, on which resilient axial thrust is applied, with a diaphragm of annular sleeve type interconnecting and confining the relatively floating members, and means of an extremely simple and inexpensive type to prevent relative rotation thereof. These structures may be produced quickly and cheaply from stampings, and the assembly thereof to finished form is a very simple matter indeed. In assembled form, each of the seals is entirely self-contained and applicable for its intended purpose with a minimum of difficulty.

What I claim is:

1. A seal comprising a pair of annular, concentric members, one of which has a radially extending portion shaped to provide a recess opening forwardly of the seal to receive a sealing ring and the other of which is provided with a forwardly and radially inwardly inclined portion in axial alignment with said first named portion, a single coil spring axially abutting said members to urge the same apart, said spring engaging the radially extending portion of the first member and being in encircling relation to the inclined portion of the other member, said portions being provided with interengaging elements acting to restrain relative rotation of said members, and a flexible, tubular diaphragm disposed outwardly of said respective portions and extending axially between said members in fixed relation at its ends thereto.

2. A seal comprising a pair of annular, concentric members, one of which has a radially extending portion shaped to provide a recess opening forwardly of the seal to receive a sealing ring and the other of which is provided with a forwardly and radially inwardly inclined portion in axial alignment with said first named portion, a single coil spring axially abutting said members to urge the same apart, said spring engaging the radially extending portion of the first member and being in encircling relation to the inclined portion of the other member, said portions being provided with interengaging elements acting to restrain relative rotation of said members, said members each being shaped to provide an annular channel located outwardly of said respective portions, and a flexible, tubular diaphragm extending axially between said members, said diaphragm being clamped at its opposite ends in said respective channels.

3. A seal comprising a pair of annular, concentric members, one of which has a radially extending portion shaped to provide a recess opening forwardly of the seal to receive a sealing ring and the other of which is provided with a forwardly and radially inwardly inclined portion in axial alignment with said first named portion, a single coil spring axially abutting said members to urge the same apart, said spring engaging the radially extending portion of the first member and being in encircling relation to the inclined portion of the other member, said portions being provided with interengaging elements acting to restrain relative rotation of said members, said members each being shaped to provide an annular channel located outwardly of said respective portions, a flexible, tubular diaphragm extending axially between said members, said diaphragm being clamped at its opposite ends in said respective channels, and an annular axially extending shield surrounding said members and said diaphragm, said shield being fixedly secured to one of said members.

RUDOLPH J. VEDOVELL.

REFERENCES CITED

The following references are of record in the file of this patent:

UNITED STATES PATENTS

| Number | Name | Date |
|---|---|---|
| 2,243,255 | McDonald | May 27, 1941 |
| 2,287,207 | Vedovell | June 23, 1942 |
| 2,301,723 | Vedovell | Nov. 10, 1942 |
| 2,347,118 | Matter | Apr. 18, 1944 |
| 2,358,830 | Schick | Sept. 26, 1944 |
| 2,365,351 | Matter | Dec. 19, 1944 |